(12) United States Patent
Chiasson et al.

(10) Patent No.: US 8,899,265 B2
(45) Date of Patent: Dec. 2, 2014

(54) PLASTIC FUEL TANK WITH INCREASED DEFORMATION STABILITY

(75) Inventors: Joseph Douglas Chiasson, Royal Oak, MI (US); Paul Daniel Reuther, Oxford, MI (US); David Hill, Commerce Township, MI (US)

(73) Assignee: Inergy Automotive Systems Research S.A., Brussels (BE)

( * ) Notice: Subject to any disclaimer, the term of this patent is extended or adjusted under 35 U.S.C. 154(b) by 0 days.

(21) Appl. No.: 13/807,475

(22) PCT Filed: Jun. 22, 2011

(86) PCT No.: PCT/EP2011/060407
§ 371 (c)(1),
(2), (4) Date: Mar. 22, 2013

(87) PCT Pub. No.: WO2012/000856
PCT Pub. Date: Jan. 5, 2012

(65) Prior Publication Data
US 2013/0192702 A1 Aug. 1, 2013

Related U.S. Application Data

(60) Provisional application No. 61/359,477, filed on Jun. 29, 2010.

(30) Foreign Application Priority Data

Jul. 12, 2010 (EP) ..................................... 10169212

(51) Int. Cl.
*B60K 15/073* (2006.01)
*B60K 15/035* (2006.01)
(Continued)

(52) U.S. Cl.
CPC .......... *B60K 15/035* (2013.01); *B29C 2791/007* (2013.01); *B29L 2031/7172* (2013.01); *B29C*
(Continued)

(58) Field of Classification Search
CPC ........... B60K 15/077; B60K 15/03177; F02M 37/106; F02M 37/103; F02M 37/10
USPC .......................... 123/495, 509, 514; 220/564; 137/565.17, 565.22; 280/833, 834, 835
See application file for complete search history.

(56) References Cited

U.S. PATENT DOCUMENTS 5,518,017 A * 5/1996 Snook, Jr. ........................ 137/38
5,951,050 A * 9/1999 Siekmann ..................... 280/830
(Continued)

FOREIGN PATENT DOCUMENTS

DE         17 80 682      2/1977
DE    10 2005 056 860      5/2007

OTHER PUBLICATIONS

European Search Report Issued Feb. 14, 2011 in Application No. EP 10 16 9212 Filed Jul. 12, 2010.
(Continued)

*Primary Examiner* — Craig Schneider
*Assistant Examiner* — Angelisa Hicks
(74) *Attorney, Agent, or Firm* — Oblon, Spivak, McClelland, Maier & Neustadt, L.L.P.

(57) ABSTRACT

A plastic fuel tank and a process for manufacturing a fuel tank, the fuel tank including an upper wall, a lower wall, and at least one kiss point formed by welding together a multiplicity of contact points of the upper and lower walls and an accessory. Both the upper and lower walls show a concave recess in the kiss point area so that the weld of the kiss point is located in between planes defined by the upper and lower walls respectively; a bottom of the upper concave recess extends substantially beyond the weld of the kiss point, while a bottom of the lower concave recess does not; the accessory is at least partially located under the extension of the bottom of the upper concave recess.

11 Claims, 2 Drawing Sheets

(51) Int. Cl.
  *B60K 15/06* (2006.01)
  *B29L 31/00* (2006.01)
  *B29C 49/00* (2006.01)
  *B60K 15/03* (2006.01)
  *B60K 15/077* (2006.01)
  *B29C 49/04* (2006.01)

(52) U.S. Cl.
  CPC ............. 2791/006 (2013.01); *B29C 2049/0057* (2013.01); *B60K 2015/03105* (2013.01); B29C 49/00 (2013.01); B60K 15/03177 (2013.01); B60K 15/073 (2013.01); *B60K 2015/03453* (2013.01); *B60K 2015/0777* (2013.01); *B29C 49/04* (2013.01); B60K 15/06 (2013.01); *B60K 2015/03111* (2013.01)
  USPC ..................................... 137/565.17; 123/509

(56) References Cited

U.S. PATENT DOCUMENTS

| | | | |
|---|---|---|---|
| 2002/0100759 | A1 | 8/2002 | Schmidt et al. |
| 2003/0108695 | A1* | 6/2003 | Freek et al. ................. 428/34.1 |
| 2005/0100697 | A1* | 5/2005 | Sandstrom et al. .......... 428/35.7 |
| 2006/0207991 | A1* | 9/2006 | Sugiura .......................... 220/563 |
| 2008/0265461 | A1* | 10/2008 | Freund et al. ............ 264/272.15 |
| 2009/0126693 | A1 | 5/2009 | Plissart et al. |
| 2009/0134175 | A1 | 5/2009 | Bleuel et al. |

OTHER PUBLICATIONS

International Search Report Issued Aug. 8, 2011 in PCT/EP11/60407 Filed Jun. 22, 2011.

* cited by examiner

PLASTIC FUEL TANK WITH INCREASED DEFORMATION STABILITY

The instant invention relates to a plastic fuel tank with increased deformation stability.

Recently, a new category of vehicle has been introduced to the market, which uses both electricity and internal combustion to propel itself. This group of vehicles has been called "hybrid" vehicles. Although these vehicles make up only a small portion of the global automotive market, their market share increases each year. A new derivation of the hybrid uses electricity only for the first 40 to 60 miles of a given journey assuming the vehicle was plugged into electrical power for a predetermined amount of time before the journey. These vehicles are deemed "plug-in hybrids".

Typically, fuel vapours are generated inside of a fuel tank due to fuel pressure and temperature variations and are stored in a charcoal canister to prevent evaporative emissions of hydrocarbons into the atmosphere. These vapours are periodically purged out of the canister and sent to the engine where they are consumed during the normal combustion process. On a standard gasoline engine vehicle this can occur whenever possible to prevent the canister from becoming stuffed and bleeding hydrocarbons into the environment. Generally these purging periods and associated purge volumes are limited on a hybrid vehicle and when the vehicle is operating in electric mode no purging at all can occur. A "plug-in hybrid" vehicle may go many driving cycles without ever running the gasoline engine. Therefore, a need arises for the fuel system to contain vapour for long periods of time by keeping the system sealed and under pressure in order to limit fuel evaporation.

There are several solutions to limit the loading with vapours of the carbon canister. One of these solutions is to seal the tank. This will pressurize the tank because vapour generation is highly related to the pressure inside the fuel tank. Vapour formation leads to a build-up of a pressure up to a certain equilibrium point where basically no more vapour is formed. It is generally assumed that no more vapour generation occurs after a pressure of 30 to 45 kPa has been built up. Thus, a tank pressurized with pressure from approximately 20 kPa to approximately 50 kPa will significantly reduce the loading with fuel vapours of the carbon canister.

The presently used plastic fuel tanks are generally not designed for an internal pressure above 10 kPa without showing a significant deformation. However, the specifications to be met for deformation of the tank walls are very narrow, so that it is important to avoid an increase in deformation.

A well known technique to improve the deformation stability of hollow plastic bodies is to use a so-called kiss point or tack-off point, like described in US 2002/0100759. The principle of this technique is to locally connect the upper and lower walls of the tank through weld points/areas. The main draw back of this technique is that since the kiss points are of small size in order to limit the loss of useful volume of the hollow body, they lead to the concentration of mechanical stress at aid kiss points, which may lead to cracks or other damages over time.

On the other hand, one of the requirements that a fuel tank must fulfill is that of supplying an engine with fuel even under severe travelling conditions, such as climbing a hill, cornering with an almost empty tank etc. Now, under these conditions, the fuel pump must be regularly supplied with fuel, even if the tank contains no more than a small quantity of fuel.

In order to satisfy this type of requirement, it is known to use a fuel reserve container (or swirl pot) serving to capture and retain fuel so as to prevent the pump from unpriming and to guarantee that the pump will prime after the vehicle has run out of fuel. These swirl pots may be moulded in one piece with the tank wall or they may be separate parts. The second type has the disadvantages that an orifice must be made to insert the swirl pot into the tank, which can lead to leaks, and that the size of the swirl pot is limited by the size of this orifice.

US 2009/0134175 discloses the idea of combining a kiss-point and a swirl pot at a same location into the tank. For doing so, a kiss point is made by deforming the upper wall of the tank only and by welding it to the lower wall in a way such that a swirl pot is realized, which is delimited by the deformed portion of the upper wall and by a closing plate (flange). The advantage of such a method is that no orifice must be made into the tank wall and that the "lost" volume of the kiss point is usefully used. However, since the deformation of the upper wall is very high, localized thinning will occur which will reduce the mechanical strength in this area. Also, this thinning limits the size of the swirl pot and the size/shape choice of the pump module.

Accordingly, it is an object of the present invention to provide a plastic fuel tank with increased deformation stability and little lost volume, enabling a design with a swirl pot of high capacity.

Therefore, the present invention concerns a plastic fuel tank comprising an upper wall, a lower wall, at least one kiss point formed by welding together a multiplicity of contact points of the upper and lower walls and an accessory, characterized in that:
- both the upper and lower tank walls show a concave recess in the kiss point area so that the weld of the kiss point is located in between the planes defined by the upper and lower walls respectively
- the bottom of the upper concave recess extends substantially beyond the weld of the kiss point, while the bottom of the lower one does not
- the accessory is at least partially located under the extension of the bottom of the upper concave recess.

As a result of this geometry, local thinning is reduced while still allowing to have clearance for an accessory (like a pump and/or a swirl pot) and the obtained assembly is very rigid and mechanically resistant.

The fuel tank according to the invention is made of plastic (i.e. its wall is principally made of plastic).

The term "plastic" means any material comprising at least one synthetic resin polymer.

Any type of plastic may be suitable. Particularly suitable plastics belong to the category of thermoplastics.

In particular, it is possible to use polyolefins, thermoplastic polyesters, polyketones, polyamides and copolymers thereof. A blend of polymers or copolymers may also be used, similarly it is also possible to use a blend of polymeric materials with inorganic, organic and/or natural fillers such as, for example but non-limitingly: carbon, salts and other inorganic derivatives, natural or polymeric fibers. It is also possible to use multilayer structures composed of stacked and joined layers comprising at least one of the polymers or copolymers described above.

One polymer that is often used is polyethylene. Excellent results have been obtained with high-density polyethylene (HDPE).

The wall of the tank may be composed of a single thermoplastic layer, or of two layers. One or more other possible additional layers may, advantageously, be composed of layers made of a barrier material to liquids and/or gases. Preferably, the nature and thickness of the barrier layer are chosen so as to minimize the permeability of liquids and gases in contact with the internal surface of the tank. Preferably, this layer is based on a barrier resin, that is to say a resin that is impermeable to the fuel such as, for example, EVOH (a partially hydrolyzed ethylene/vinyl acetate copolymer). Alternatively, the tank may be subjected to a surface treatment (fluorination or sulfonation) for the purpose of making it impermeable to the fuel.

The tank according to the invention preferably comprises an EVOH-based barrier layer located between the HDPE-based outer layers.

Generally, the upper and lower walls of the tank (which respectively comprise the tank top and bottom) have envelopes which are substantially horizontal when the tank is mounted on a vehicle.

According to the invention, the multiplicity of contact points which are welded together to form the kiss point are located in between the planes of the tank upper and lower walls. This means that both walls had to be deformed in order to show a concave recess where the weld of the kiss point is located. Hence, according to the invention, the terms "kiss point" do not only designate the welded portion but also, the deformed portions of the tank walls (concave recesses) where said welded portion is located.

According to the invention, the bottom of the upper concave recess (the one of the upper wall) extends substantially beyond the weld of the kiss point while the bottom of the lower concave recess does not so that clearance for the insertion of the pump under the extension of the upper recess is provided. By "bottom" is meant the lowest part of the concave recesses when viewed from above so on a front view (or a vertical cut) of the tank, for the upper recess, it actually is the lowest part of the recess while for the lower one, it is the highest part. By "substantially" is meant that the bottom of the upper recess is extended by at least 50%, preferably at least 100% and even up to 400% and more of its surface area, being noted that said bottom must not necessarily be planar nor substantially horizontal.

According to the invention, an accessory is at least partially (and preferably: completely) located underneath said extension. By "accessory" is meant any device that performs a useful function in the reservoir like storing, venting, feeding (fuel or an additive). Generally speaking, it is preferable that the inserted accessory touches (is in contact with) the extension of the upper recess and the lower tank wall so as to obtain maximum mechanical reinforcement.

Preferably, the accessory is a fuel pump. Locating the fuel pump underneath the bottom extension of the upper part of the kiss point allows to get a very high degree of mechanical reinforcement, especially if the bottom extension of the upper recess and the lower tank wall are mechanically (eventually indirectly) linked through the pump.

The upper recess of the kiss point may be used for fixing an accessory on the tank but preferably, the volume delimited by this upper recess is closed off by a closing plate (flange) or any other means which seals off said recess tightly so that it can act as additional fuel reserve. This can be done by welding the plate on the recess, or by mechanically fixing it using a seal and locking ring(s) or other mechanical fixing devices which allow to constrain the seal and which are well known to those skilled in the art.

This embodiment is particularly interesting when the accessory under the bottom extension of the upper recess is a pump. In that case, even more preferably, the pump is located inside a small reservoir which is fixed on and extends from an opening in the bottom extension of the upper recess because by doing so, the upper recess and said small reservoir define a swirl pot of high capacity. In that embodiment, preferably, the small reservoir has no cover (so that fuel can freely fall into it) and it extends from the opening in the bottom of the upper recess to the bottom wall of the tank. This embodiment allows bottom referencing of the small reservoir without the use of spring loading since said reservoir is located in an area of very low deformation, adjacent to the kiss point.

Still in this embodiment, the small reservoir (bottom of the swirl pot) is preferably equipped with a first fill valve (allowing to fill the swirl pot after the tank has been first filled with fuel), a venturi (preferably coupled to the pump so that the swirl pot can be filled with fuel from the tank during pump operation) and/or with a filter (retaining contaminants). The upper reserve, which constitutes a mounting place easily accessible, preferably contains a pressure regulator and/or a filter. The flange closing off this reserve is preferably equipped with an electrical connector and/or a fuel line connector. In order for this reserve to be filled with fuel when the level in the tank is high enough and in order to prevent a pressure differential between the tank and the swirl pot, an overflow orifice is preferably made into the wall of the upper recess.

The tank in accordance with the instant invention may be reinforced by the use of reinforced plastics or it may contain internal elements commonly used to integrate functional means like pumps, level indicators or the like inside the tank or e.g. means like baffles commonly used for noise reduction. Suitable concepts and processes to integrate those elements are known to the skilled man and need not to be described in detail here.

The present invention also relates to a method for manufacturing a plastic fuel tank as described above, comprising the following steps:
  inserting a parison into a mould comprising two prints
  pressing the parison against said prints using a pressurized gas and/or by sucking vacuum behind the prints
  forming at least one kiss point by welding together a multiplicity of contact points of the upper and lower walls in a way such as to obtain a concave recess in the kiss point area of both the upper and lower walls, the bottom of the upper concave recess extending substantially beyond the weld of the kiss point, while the bottom of the lower one does not.
  inserting an accessory at least partially under the extension of the bottom of the upper concave recess.

The preferred process for the manufacture of the fuel tanks in accordance with the instant invention is the extrusion blow molding process. In this process, an extruded parison (or perform, which may be cylindrical or in the shape of two sheets, flat or not) is shaped in the mould essentially by using a pressurized gas (air generally) injected through a needle (or blowing needle). This does not preclude that vacuum behind the mould prints might be used as well to assist this shaping and/or to hold the parison into the mould before and after shaping it.

As a result, the non-contacting portion of the counterform in the upper mold half forms the area for piercing the hole for the pump. In an additional embodiment of the invention, the blowing needle is located on this non contacting portion of the upper mold half. This allows for the hole to be pre-formed, and ensures contact of the parison to the mould surface where the blowing needle is located, since the counterform created to form the kiss point is usually the first surface to contact the molten plastic parison.

The present invention is described more in detail with ref. to FIGS. 1 and 2 attached which merely illustrate some preferred embodiments of said invention without limiting its scope thereto.

Figure 1:
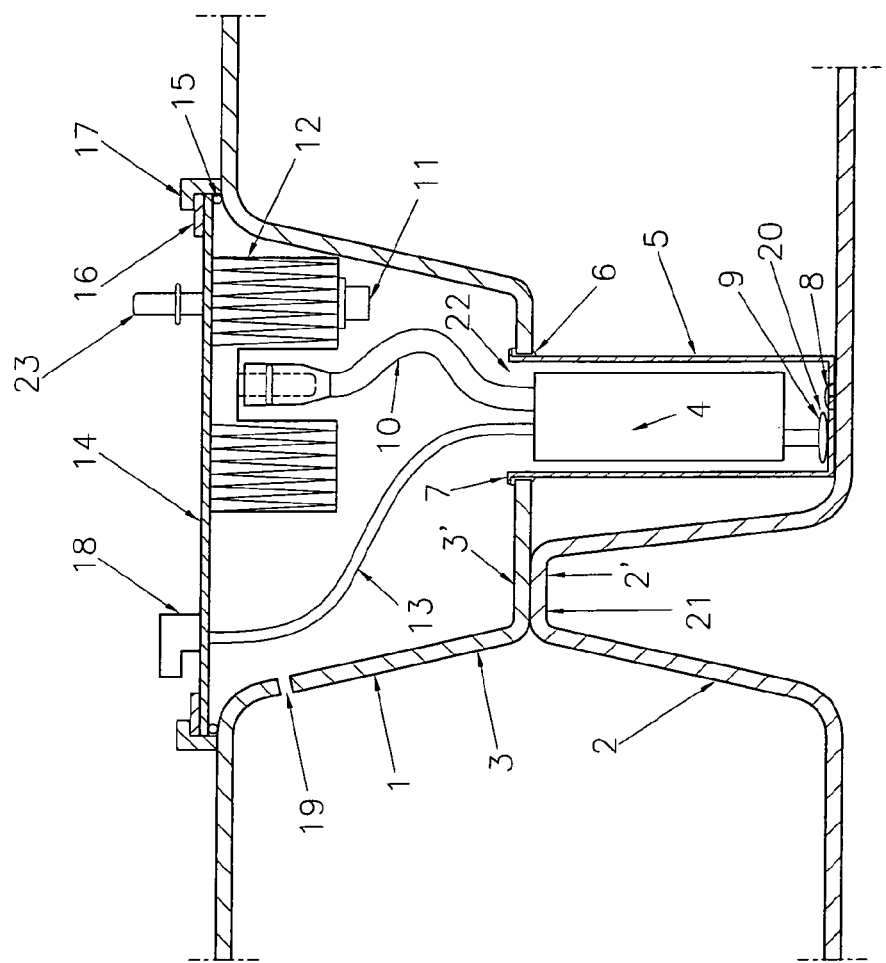
FIG. 1 shows a cross sectional view (cut through a vertical plane passing through a kiss point) of a fuel tank in accordance with some preferred embodiments of the instant invention.

In the weld of the kiss point (21), the upper tank section (1) is connected to the lower tank section (2) The bottom (2') of the lower tank section (2) is smaller than the one (3') of the upper tank section (1). This allows clearance for the insertion of a fuel pump (4) encased in a small reservoir (5) that contains a first fill valve (8), a venturi (20), used to fill the reservoir (5) during pump operation, and a filter screen (9) designed to wick fuel from the bottom of the reservoir (5) and prevent contaminants from entering the fuel pump. The shape of the upper tank section (1) is used as a means for storing additional reserve fuel to aid in low fuel dynamic driving conditions. The fuel pump (4) pumps fuel into the reservoir (5) during normal driving, at a rate that keeps the reservoir (5) full regardless of the fuel level in the tank. As a result, in low fuel conditions, fuel is concentrated in this reservoir (5) creating a small reserve of roughly 1-4 liters of fuel that is robust to steep grades and dynamic sloshing that could potentially move fuel away from the central pickup point in the tank.

A hole (22) is pierced in the upper tank section (1) to allow for the insertion of the small reservoir (5) which is retained by a mechanical lock (7) and a seal (6) preventing fluid from draining out of the upper tank section (1). As a result the upper tank section (1) becomes an extension of the small reservoir (4). A fuel pressure regulator (11) and a fuel filter (12) are also placed in this volume; they are connected to the pump (4) through a fuel line (10).

A metal ring (17) is encapsulated on the top of the upper tank section (1). This ring is used to constrain an elastomer o-ring seal (15) between the upper tank section (1) and a circular disc (14) creating a leak tight seal between the reservoir created by the depression (3) in the upper tank section (1) and the circular disk (14).

An electrical connector (18) and a fuel outlet (23) are contained in the circular disk (14). They are respectively connected to the pump via an electrical line (13) and to the fuel filter (12).

An overflow orifice (19) is included in the upper tank section (1), preventing the reservoir from a pressure differential relative to the rest of the tank and allowing fuel to flow in when the level inside the tank reaches said orifice.

The manufacturing process preferably is comprised of 5 major steps.

Figure 2:
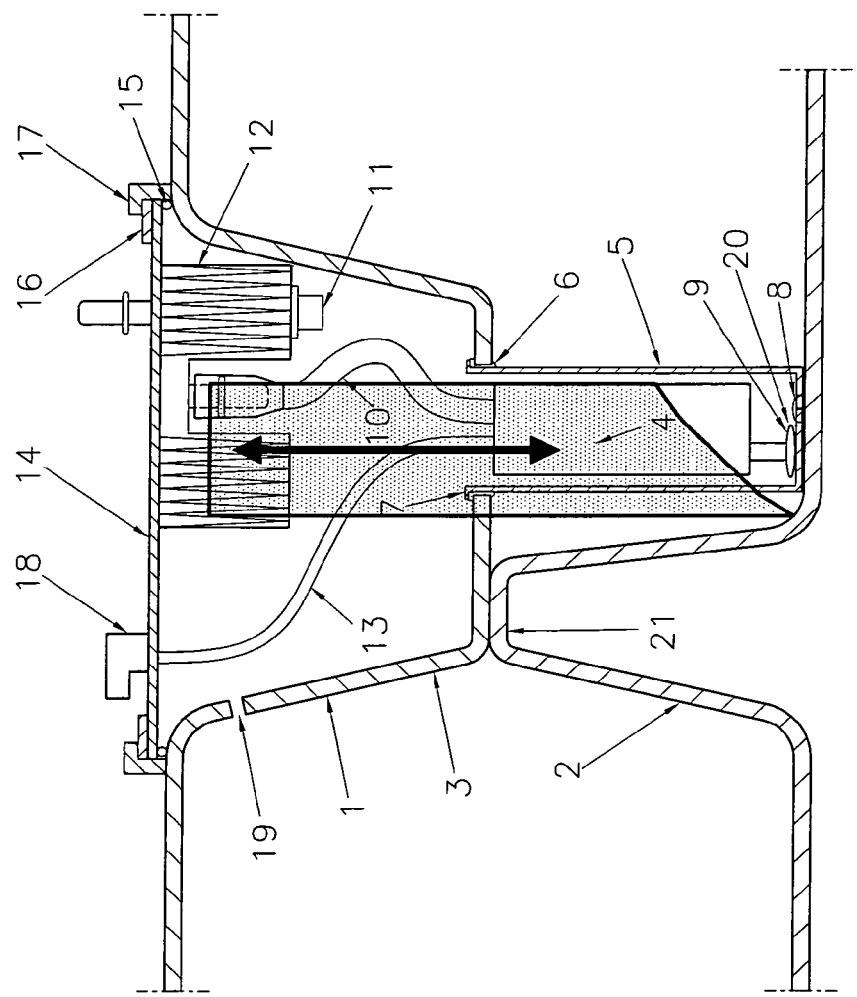
FIG. 2 shows the same view but additionally shows how the blowing needle was moved during the manufacture of the tank.

The first step consists of blow molding a plastic shell (1, 2) that includes the upper recess (3) and the lower recess (21). In the preferred embodiment of this invention, a metal ring (17) is encapsulated into the surface of the tank (1) outside of the outer diameter of the upper recess feature (3). In one embodiment of the invention, the hole (22) is formed using the blowing needle. This embodiment is shown in FIG. 2.

In the second step, the hole (19) is bored. In an additional embodiment of the invention, the second hole (22) is also bored in this step.

In the third step, the small reservoir (5) containing the pump (4), the filter (9), the venturi (20), the first fill valve (8), the fuel line (10) and the electrical line (13) are inserted through hole (22) as an assembly. Also attached to this assembly is an elastomer seal (6) that seals radially against the hole (22) and potentially axially against the upper recess (3).

In the fourth step, the connectors of the fuel line (10) and of the electrical line (13) are attached to the circular disc (14).

In the final step, a seal (15) is placed on the tank surface (1) followed by the circular disc (14), including the filter (12), the pressure regulator (11) and a locking ring (16). As the locking ring is rotated, it interfaces with the encapsulated ring (17) and compresses the seal (15) creating a hermetic seal between the inside and the outside of the tank.

The invention claimed is:

1. A plastic fuel tank comprising:
   an upper wall;
   a lower wall;
   at least one kiss point formed by welding together a multiplicity of contact points of the upper and lower walls; and
   an accessory, wherein:
   both the upper and lower walls show a concave recess in an area of the kiss point so that the weld of the kiss point is located in between planes defined by the upper and lower walls respectively;
   a bottom of the upper concave recess extends substantially beyond the weld of the kiss point, while a bottom of the lower concave recess one does not extend substantially beyond the weld of the kiss point;
   the accessory is at least partially located under the extension of the bottom of the upper concave recess; and
   the accessory is disposed inside a reservoir, the reservoir being different from the upper concave recess, and the reservoir being fixed on and extending downwards from an opening in the extension of the upper concave recess.

2. The plastic fuel tank according to claim 1, wherein the accessory is in contact with the extension of the upper concave recess and the lower wall.

3. The plastic fuel tank according to claim 1, wherein the accessory is a fuel pump.

4. The plastic fuel tank according to claim 3, wherein a volume delimited by the upper concave recess is closed off by a sealing member that seals off the upper concave recess tightly so that the upper concave recess can act as a fuel reserve.

5. The plastic fuel tank according to claim 4, wherein the upper concave recess includes a pressure regulator and/or a filter.

6. The plastic fuel tank according to claim 4, wherein the sealing member is a flange that includes an electrical connector and/or a fuel line connector.

7. The plastic fuel tank according claim 4, further comprising an overflow orifice made into the wall of the upper concave recess.

8. The plastic fuel tank according to claim 1, wherein the reservoir has no cover and extends from the opening in the bottom of the upper concave recess to the lower wall of the tank.

9. The plastic fuel tank according to claim 1, wherein the reservoir includes a first fill valve, a venturi, and/or a filter.

10. A method for manufacturing a plastic fuel tank according to claim 1, comprising:
    inserting a parison into a mold comprising two prints;
    pressing the parison against the prints using a pressurized gas and/or by sucking vacuum behind the prints;
    forming at least one kiss point by welding together a multiplicity of contact points of the upper and lower walls so as to obtain a concave recess in an area of the kiss point of both the upper and lower walls, a bottom of the upper concave recess extending substantially beyond the weld of the kiss point, while a bottom of the lower concave recess does not extend substantially beyond the weld of the kiss point; and inserting an accessory at least partially under the extension of the bottom of the upper concave recess.

11. The method according to claim 10, wherein:

the fuel tank is shaped in a mold comprising an upper and a lower part by using a pressurized gas injected through a needle;

the kiss point is obtained through counterforms into the upper and lower parts, the counterform of the upper part having a portion in contact with the counterform in the lower part and a non-contacting portion; and the needle is located on the non-contacting portion.

* * * * *